US012715011B2

(12) United States Patent
Joubert et al.

(10) Patent No.: US 12,715,011 B2

(45) Date of Patent: Aug. 25, 2026

(54) SYSTEM FOR DROPPING A LIQUID

(71) Applicants: INSTITUT NATIONAL POLYTECHNIQUE DE TOULOUSE, Toulouse (FR); CENTRE NATIONAL DE LA RECHERCHE SCIENTIFIQUE (CNRS), Paris (FR); KEPPLAIR EVOLUTION, Paris (FR)

(72) Inventors: David Joubert, Paris (FR); Dominique Legendre, Toulouse (FR); Grégory Ehses, Toulouse (FR)

(73) Assignees: INSTITUT NATIONAL POLYTECHNIQUE DE TOULOUSE, Toulouse (FR); Centre National de la Recherche Scientifique (CNRS), Paris (FR); KEPPLAIR EVOLUTION, Paris (FR)

( * ) Notice: Subject to any disclaimer, the term of this patent is extended or adjusted under 35 U.S.C. 154(b) by 649 days.

(21) Appl. No.: 17/435,357

(22) PCT Filed: Feb. 27, 2020

(86) PCT No.: PCT/EP2020/055204

§ 371 (c)(1),
(2) Date: Aug. 31, 2021

(87) PCT Pub. No.: WO2020/174071

PCT Pub. Date: Sep. 3, 2020

(65) Prior Publication Data

US 2022/0143635 A1 May 12, 2022

(30) Foreign Application Priority Data

Feb. 27, 2019 (FR) ...................................... 1901992

(51) Int. Cl.

*B05B 9/04* (2006.01)
*A62C 3/02* (2006.01)

(Continued)

(52) U.S. Cl.

CPC .......... *B05B 9/0403* (2013.01); *A62C 3/0235* (2013.01); *A62C 3/0242* (2013.01);

(Continued)

(58) Field of Classification Search

CPC ....... A62C 3/02; A62C 3/0207; A62C 3/0214; A62C 3/0228; A62C 3/0235;

(Continued)

(56) References Cited

U.S. PATENT DOCUMENTS 3,698,480 A 10/1972 Netwon
4,172,499 A * 10/1979 Richardson ............. B01F 23/50 169/53

(Continued)

FOREIGN PATENT DOCUMENTS

WO 2010/080957 A1 7/2010

OTHER PUBLICATIONS

International Search Report mailed May 28, 2020, issued in corresponding International Patent Application No. PCT/EP2020/055204, filed Feb. 27, 2020, 5 pages.

(Continued)

*Primary Examiner* — Darren W Gorman

(74) *Attorney, Agent, or Firm* — CHRISTENSEN O'CONNOR JOHNSON KINDNESS PLLC

(57) ABSTRACT

A system for dropping a liquid, comprising a liquid storage reservoir provided with a liquid outlet area that comprises an outlet nozzle and a dropping hatch. Furthermore, the drop- (Continued)

ping System includes structures for varying the air pressure in the storage reservoir depending on the level of liquid in the reservoir.

10 Claims, 11 Drawing Sheets

(51) Int. Cl.
*B05B 1/34* (2006.01)
*B05B 12/00* (2018.01)
*B05B 12/08* (2006.01)
*B05B 13/00* (2006.01)
*B64D 1/16* (2006.01)
*F04F 1/06* (2006.01)

(52) U.S. Cl.
CPC .......... *B05B 1/3402* (2018.08); *B05B 12/006* (2013.01); *B05B 12/081* (2013.01); *B05B 13/005* (2013.01); *B64D 1/16* (2013.01); *F04F 1/06* (2013.01)

(58) Field of Classification Search
CPC ...... A62C 3/0242; A62C 3/0292; B64D 1/16; B64D 1/18; B05B 1/3402; B05B 9/0403; B05B 12/006; B05B 12/081; B05B 13/005; F04F 1/06
See application file for complete search history.

(56) References Cited

U.S. PATENT DOCUMENTS

| | | | | |
|---|---|---|---|---|
| 5,326,053 | A | 7/1994 | Pahl et al. | |
| 2006/0260826 | A1 | 11/2006 | Hutter et al. | |
| 2010/0263886 | A1* | 10/2010 | Rahgozar ............ | A62C 3/0242 169/46 |
| 2011/0168414 | A1* | 7/2011 | Nelson .................... | B64D 1/16 169/53 |
| 2011/0192617 | A1* | 8/2011 | Saurina Casals .... | A62C 3/0235 169/53 |
| 2017/0072234 | A1* | 3/2017 | Álvarez Montaner .. | A62C 5/02 |
| 2020/0179734 | A1* | 6/2020 | Jackson .............. | A62C 3/0242 |

OTHER PUBLICATIONS

Written Opinion mailed May 28, 2020, issued in corresponding International Patent Application No. PCT/EP2020/055204, filed Feb. 27, 2020, 12 pages.

* cited by examiner

SYSTEM FOR DROPPING A LIQUID

The present invention relates, in general, to the dropping of a liquid contained in a reservoir and more particularly to a system for dropping a liquid contained in a reservoir.

The dropping of a liquid coming from a reservoir is particularly advantageous in various applications such as the dispersion on the ground by aerial means of a retardant in the field of firefighting, of products for agricultural, meteorological or else environmental purposes, but also in the field of industry.

The two liquid dropping methods mainly used in firefighting are gravity dropping and pressurised dropping.

The gravity dropping method relies on the controlled opening of a reservoir hatch from which the liquid gradually escapes under the effect of gravity.

The flow speed of the liquid leaving the reservoir is variable, since it depends on the level of liquid in the reservoir. Although the liquid output rate can be adjusted to some extent by controlling the percentage of the hatch opening, such a method results in a footprint on the area to be covered which is inhomogeneous.

Pressurised dropping, in turn, involves using an on-board compressed air source, accumulator or compressed air generator to compress the liquid in the reservoir to allow smoother dropping of the liquid.

However, it leads to too violent dropping and, consequently, too great dispersion of the liquid on the ground.

Furthermore, the dropping under pressure poses safety problems related to the high operating pressure of the system which requires a large amount of compressed air on board the aircraft.

Moreover, the configuration of known systems for dropping a liquid leads to the appearance of drain vortices as the level of liquid in the reservoir decreases, disrupting the flow of liquid at the outlet of the reservoir, the speed and flowrate of which decrease, and transforming the initially single-phase liquid to be dropped into a two-phase mixture of gas and liquid.

The purpose of the invention is therefore to overcome these disadvantages and to provide a system for dropping a liquid with improved hydraulic performance, leading to a single-phase flow and a constant liquid outlet flowrate for an efficient and homogeneous footprint.

A liquid dropping system is therefore proposed, comprising a liquid storage reservoir provided with a liquid outlet area provided with an outlet nozzle and a dropping hatch.

Furthermore, the dropping system includes means for varying the air pressure in the storage reservoir depending on the level of liquid in the reservoir.

Preferably, the storage reservoir comprises a cylindrical storage area with a round base and a conical liquid outlet area.

Advantageously, the means for varying the air pressure in the reservoir may comprise a pressurised air diffuser capable of distributing the air supply over the surface of the liquid.

According to one embodiment, the air diffuser comprises a disc disposed in the storage reservoir downstream and at a distance from an air intake and perpendicular to said air intake.

According to another embodiment, the air diffuser can comprise at least one tube disposed perpendicular to an air intake supplying the diffuser with air.

According to another embodiment, the air diffuser may comprise at least two tubes disposed perpendicular to an air intake supplying the diffuser with air, the tubes being disposed so that the longitudinal axes of the tubes form therebetween a non-zero angle.

According to one embodiment, the pressurised air diffuser has a spiral shape.

According to one embodiment, the outlet nozzle can be bent.

Advantageously, the dropping system can comprise a pressure regulator acting on the air pressure in the reservoir and able to regulate the pressure of the liquid leaving the reservoir around a set value.

Preferably, the set value is given by the pressure of the liquid taken at the liquid outlet area or else at the terminal portion of the outlet nozzle, more specifically before the last bend of the outlet nozzle 4 when a bend is present.

Preferably, the storage reservoir comprises a cylindrical storage area with a round base and a conical liquid outlet area, the conical liquid outlet area forming an angle with a general axis of the storage reservoir comprised between 30° and 50°.

Advantageously, the dropping system can comprise a gas detector at the outlet of the storage reservoir.

Preferably, the dropping system comprises a control module acting on the pressure regulator and on the dropping hatch.

According to a particular embodiment, the dropping hatch comprises a converging nozzle, the liquid outlet section of which is variable.

The invention also relates to a firefighting aircraft, comprising a dropping system as described above and wherein the liquid is a retardant.

Other purposes, advantages and features will emerge from the following description, given for illustrative purposes only and made with reference to the appended drawings wherein.

Figure 1:
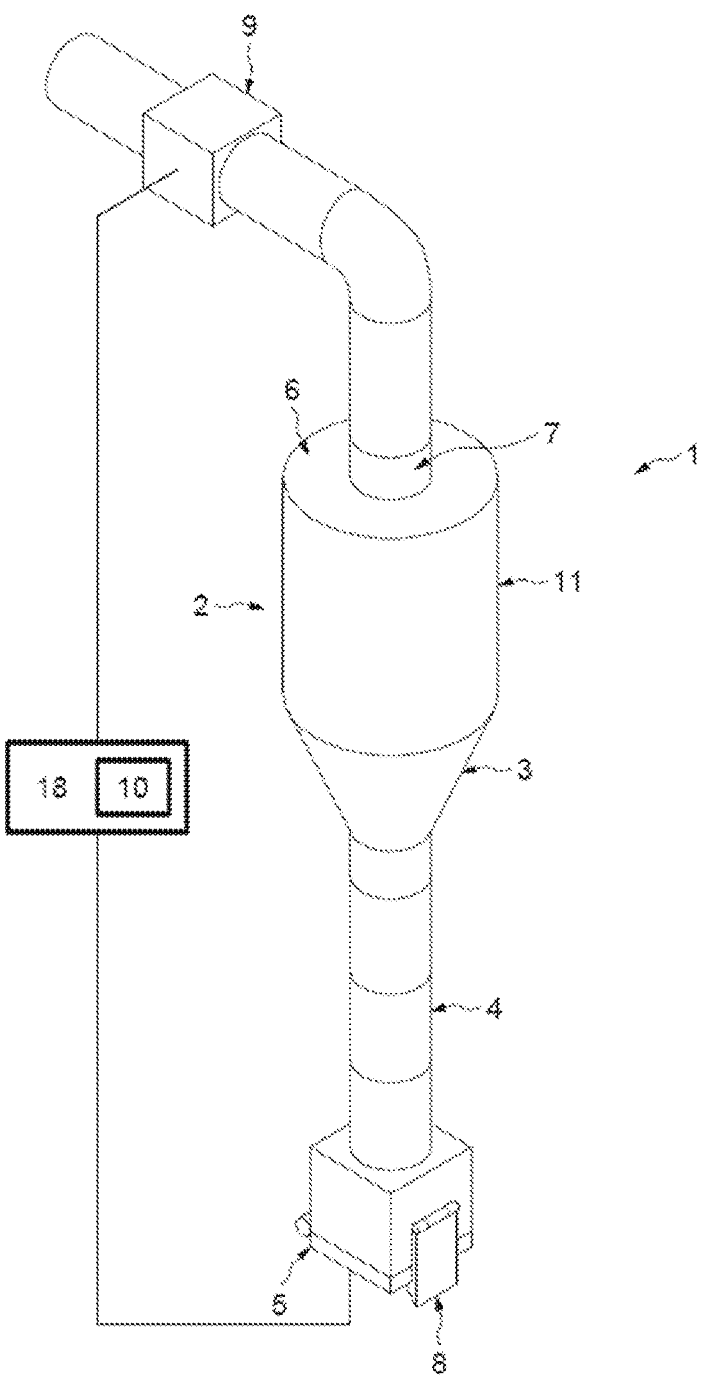
FIG. 1 shows a liquid dropping system according to the invention, comprising a dropping hatch in the closed position.

Reference will firstly be made to FIG. 1 illustrating a system for dropping a liquid according to the invention, designated by the general reference numeral 1.

Depending on the application, the liquid is in particular a solution containing water. It can be a retardant used in the field of firefighting, a product for agricultural, meteorological or else environmental purposes, but also a product used in the field of industry.

In the following description, the invention applies to the field of firefighting. The liquid is thus a retardant or water.

The dropping system 1 comprises a storage reservoir 2 capable of containing the liquid in order to drop it from the dropping system 1.

The storage reservoir 2 comprises a liquid outlet area 3. The liquid outlet area is provided with an outlet nozzle 4 and a dropping hatch 5.

In the example illustrated, the storage reservoir 2 is surmounted by a cover 6 and advantageously comprises an air intake 7 which can be disposed, as shown, in the centre of the cover 6. The air intake 7 is preferably supplied with compressed air.

The dropping hatch 5 can be associated with a latch 8 for locking the dropping hatch 5 in the closed position.

In addition, the section of the dropping hatch 5 is preferably determined according to the proportions of the reservoir 2.

The dropping hatch 5 will preferably be a hatch with instantaneous opening.

Figure 2:
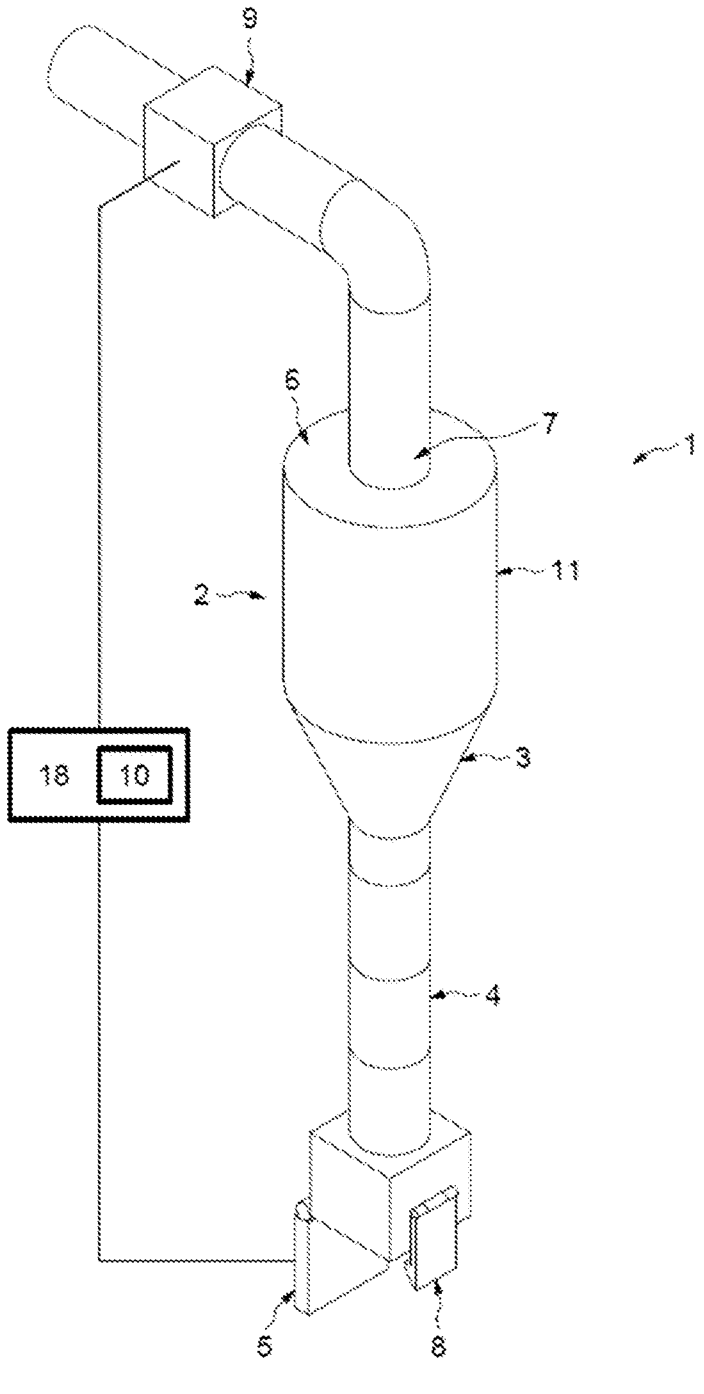
FIG. 2 shows the liquid dropping system illustrated in FIG. 1, comprising a dropping hatch in the open position.

FIGS. 1 and 2 illustrate, respectively, the dropping hatch 5 in the closed position and in the open position.

Furthermore, the dropping system 1 includes means for varying the air pressure in the storage reservoir 2 depending on the level of liquid in the reservoir 2.

In this regard, the dropping system 1 comprises a pressure regulator 10 acting on the air pressure in the reservoir 2 and able to regulate the pressure of the liquid leaving the reservoir 2 around a set value.

It will be noted in passing that initially, that is to say prior to the dropping, the liquid fills the reservoir 2, the liquid outlet area 3 and the outlet nozzle 4, which allows to avoid the formation of a two-phase mixture of gas and liquid.

The pressure regulator 10 acts on a solenoid valve 9 preferably disposed at an air supply conduit of the air intake 7, upstream of the air intake 7. The pressure of the liquid at the outlet of the reservoir 2 can thus be adjusted by varying the air pressure in the reservoir 2, itself regulated by controlling the opening of the solenoid valve 9.

In a particular embodiment, the pressure regulator 10 acts on a solenoid valve 9 disposed at an air supply conduit of the air intake 7, upstream of the air intake 7. Here, the pressure of the liquid is taken by means of a pressure sensor preferably disposed at the converging portion of the liquid outlet area or else at the horizontal portion of the outlet nozzle 4 before the last bend, if a bend is present, or else at the terminal portion 4*a* of the outlet nozzle, if no bend is present. Here, the pressure sensor gives a pressure which will be called P0 hereafter.

This servo-control depending on the pressure P0 will allow to minimise the cases of two-phase air and liquid flow. Indeed, it has been observed that the servo-control of the pressure regulator depending on P0 allows to obtain a better air front between the air and the liquid, which is cleaner, avoiding a two-phase flow.

Still in this embodiment, the pressure regulator 10 is servo-controlled to keep the pressure P0 constant.

In a particular embodiment, the pressure P0 will allow to obtain an additional datum, namely the flow speed of the liquid.

This datum can be processed by the operator in charge of the dropping to optimise the dropping of liquid depending in particular on the area to be covered, in the event of a fire, for example.

In another particular embodiment, the pressure regulator 10 generates one or more pressure ramps. Pressure management is ensured by a program predefined in advance.

The pressure ramp(s) can be adjusted according to the data associated with the aircraft such as the load factor, the attitude, or the external pressure.

Preferably, the dropping system 1 comprises a plurality of pressure sensors, not shown in the figures. The pressure sensors will advantageously be placed on the upper portion, on the central portion and on the lower portion of the storage reservoir 2 but also on the liquid outlet area 3 and at the outlet nozzle 4, in particular at the terminal portion 4*a* of the outlet nozzle 4. However, in the presence of one or more bends, the pressure sensors will advantageously be placed upstream of the last bend.

The pressure sensors will thus allow to calculate the pressure in the different areas of the reservoir 2.

Advantageously, the storage reservoir 2 can comprise a cylindrical storage area 11 with a round base.

In addition, the liquid outlet area 3 is in turn selected, preferably conical.

This configuration of the storage reservoir 2 allows to minimise the disturbances on the outgoing liquid flow and consequently allows to avoid a two-phase air and liquid flow, in favour of a single-phase flow.

Even more advantageously, and in order to further minimize disturbance, the conical liquid outlet area 3 can form an angle with a general axis of the storage reservoir 2 comprised between 30° and 50°, preferably 30° C.

In the expression "comprised between", the limits of the domain of values are comprised within this domain.

When the dropping system 1 is, for example, mounted on an aircraft for an air dropping of the liquid, it may be necessary, depending on the dimensions of the storage reservoir 2, to dispose the storage reservoir 2 at the centre of gravity of the aircraft in order to reduce the impact of the drop which could lead to the loss of control of the aircraft.

Figure 3:
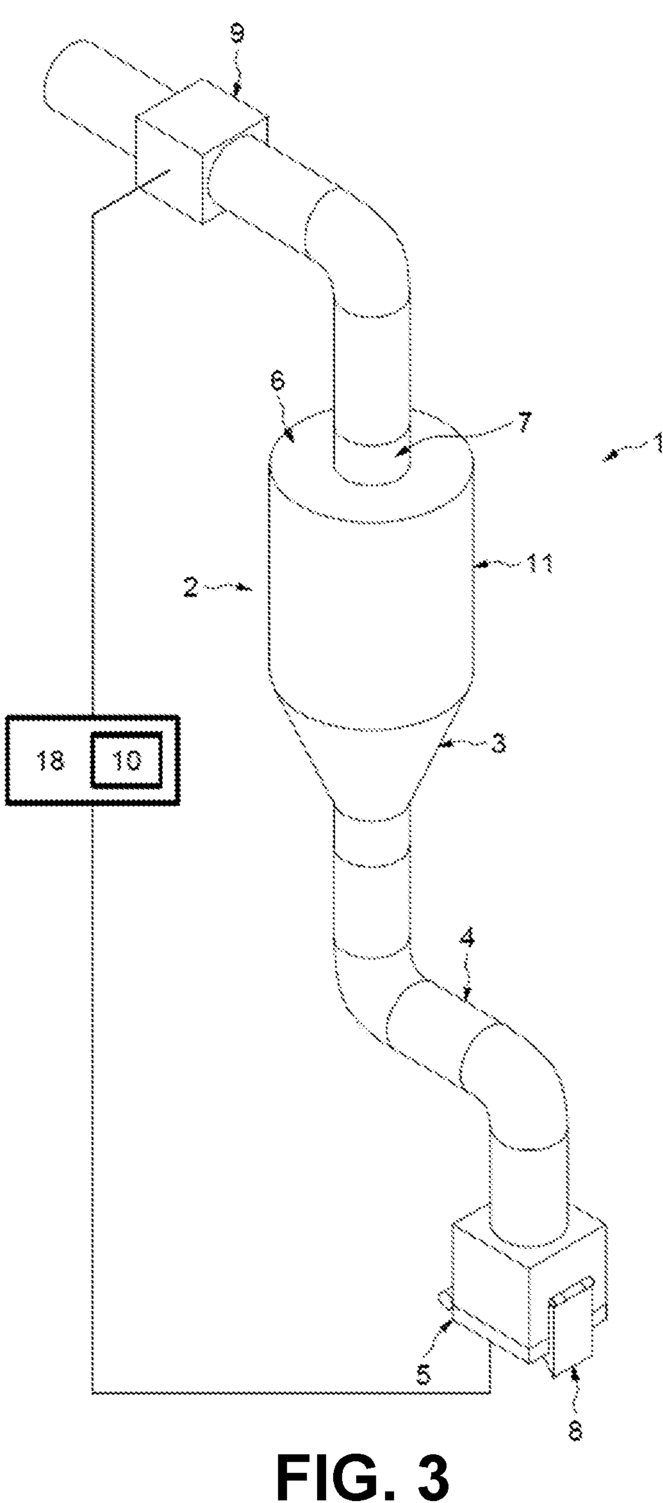
FIG. 3 shows a system for dropping a liquid according to the invention, comprising a bent outlet nozzle.

As illustrated in FIG. 3, the outlet nozzle 4 can thus be bent, which allows to separate the dropping hatch 5 from the storage reservoir 2 and to position the dropping hatch 5 at a determined location depending on the architectural constraints of the aircraft.

Figure 14:
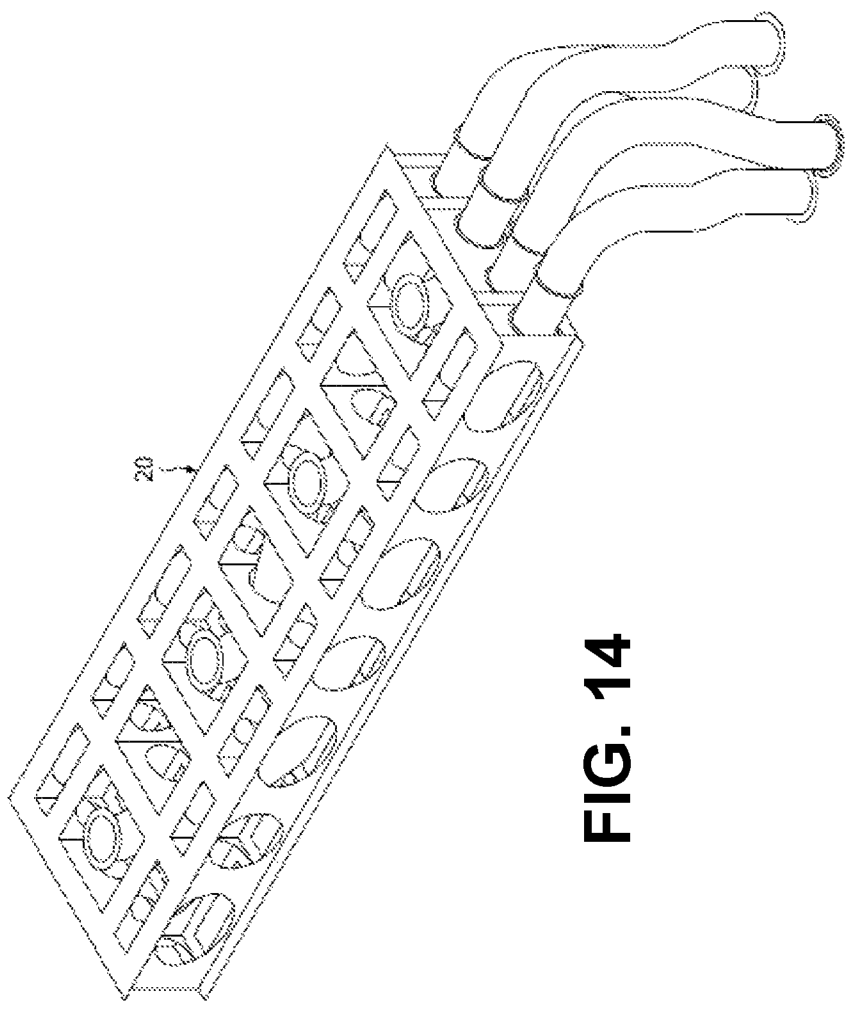
FIG. 14 illustrates a self-supporting frame device.

In an alternative embodiment, for example, still mounted on an aircraft, a self-supporting frame device 20, as illustrated in FIG. 14, may be mounted in the aircraft to allow optimum distribution of the loads constituted in particular by the storage reservoir 2 and the various pipes, in particular the outlet nozzle 4.

A self-supporting frame device will prevent imbalance problems when the liquid is dropped.

A self-supporting frame device will allow the installation of a device to collect liquids from any leaks in the system.

Advantageously, the means for varying the pressure of the air in the reservoir further comprise a pressurised air diffuser capable of distributing the air supply over the surface of the liquid and thus preventing the formation of drain vortices during the liquid dropping.

The pressurised air diffuser is preferably disposed in the upper portion of the storage reservoir 2, upstream of the liquid and downstream of the air intake 7.

Figure 4:
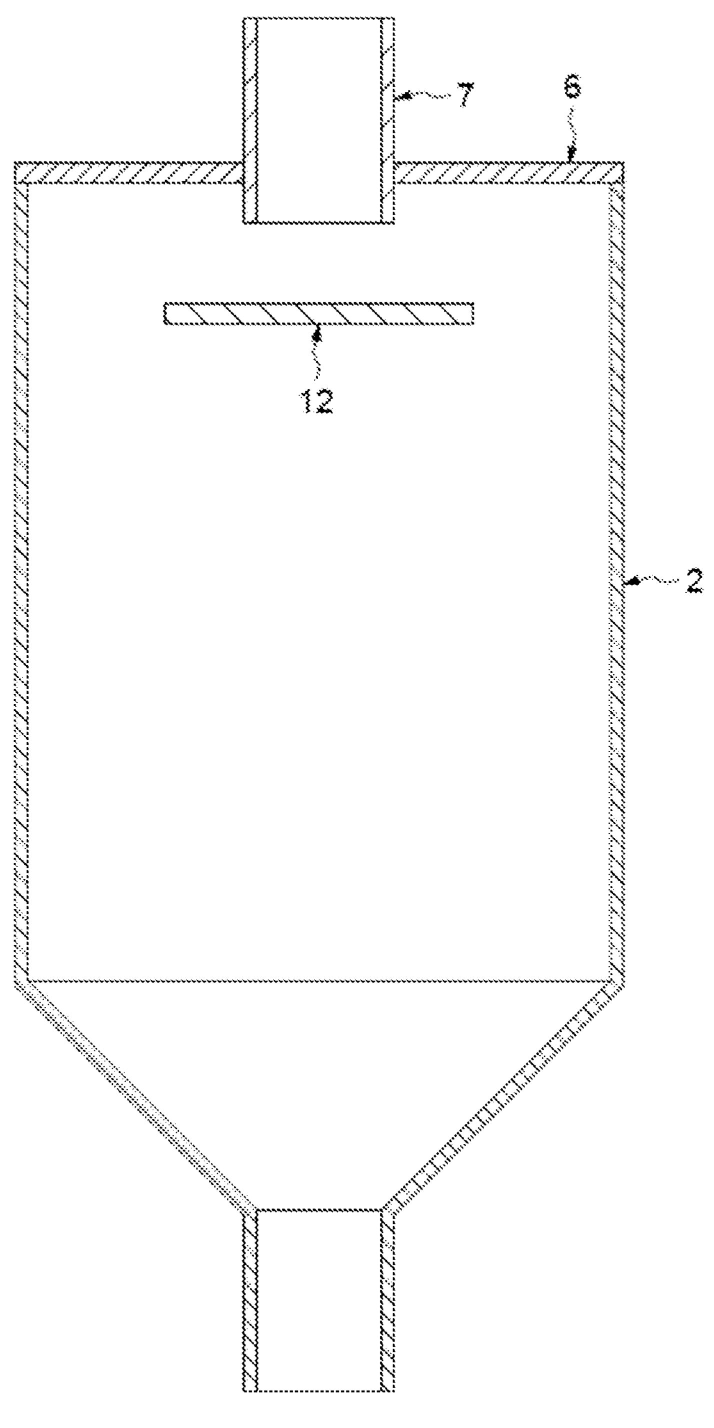
FIG. 4 illustrates a first embodiment of a pressurised air diffuser of a dropping system according to the invention.

FIG. 4 represents the storage reservoir 2 comprising a first embodiment wherein the pressurised air diffuser includes a disc 12 disposed downstream, at a distance from the air intake 7 in the reservoir 2. The disc 12 is disposed perpendicular to the air intake 7 and therefore perpendicular to the air flow entering the storage reservoir 2 via the air intake 7.

Figure 5:
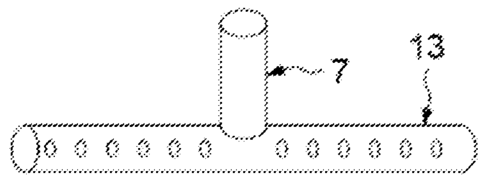
FIG. 5 illustrates a second embodiment of a pressurised air diffuser of a dropping system according to the invention.

FIG. 5 illustrates a second embodiment wherein the pressurised air diffuser comprises a tube 13 disposed perpendicular to the air inlet 7 supplying the tube 13 with air.

Figure 6:
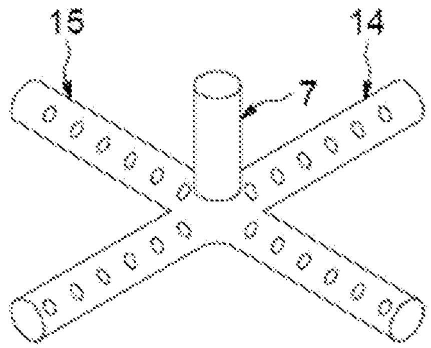
FIG. 6 illustrates a third embodiment of a pressurised air diffuser of a dropping system according to the invention.

FIG. 6 illustrates a third embodiment wherein the air diffuser comprises two tubes 14 and 15 disposed perpendicularly to the air inlet 7 which supplies the diffuser with air. The tubes 14 and 15 are disposed so that their longitudinal axes form therebetween a non-zero angle, preferably 90° C.

Provision can be made for the air diffuser to comprise a number of tubes greater than two.

The longitudinal axes of the two tubes 14 and 15 cross at a connection point located in the centre of the tubes 14 and 15, forming a cross. The air intake 7 supplies the tubes 14 and 15 at said connection point.

Figure 7:
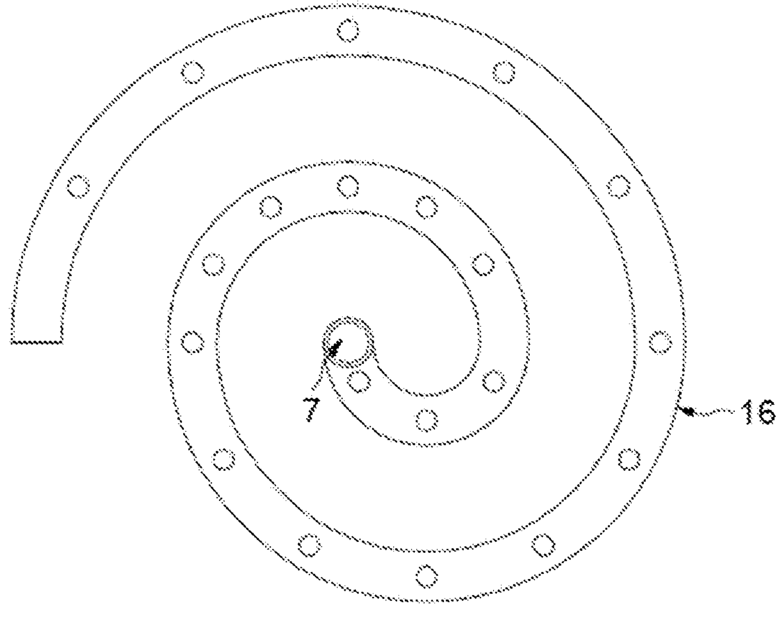
FIG. 7 illustrates a fourth embodiment of a pressurised air diffuser of a dropping system according to the invention.

FIG. 7 shows a fourth embodiment wherein the pressurised air diffuser has a spiral shape. In the example illustrated, a conduit 16 extends so as to form a spiral and is supplied with air by the air intake 7 at the centre of the spiral.

Preferably, and as illustrated in FIGS. 5, 6 and 7, the pressurised air diffuser may comprise a plurality of holes preferably disposed homogeneously on the diffuser.

The plurality of holes is thus oriented so as to create a strong and homogeneous agitation on the surface of the liquid, in particular in the central area of the storage reservoir 2, in order to prevent the formation of drain vortices which could increase with the decreasing level of liquid.

Figure 8:
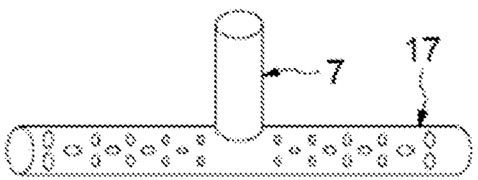
FIG. 8 illustrates a variant of the second embodiment of the pressurised air diffuser illustrated in FIG. 5.
Figure 9:
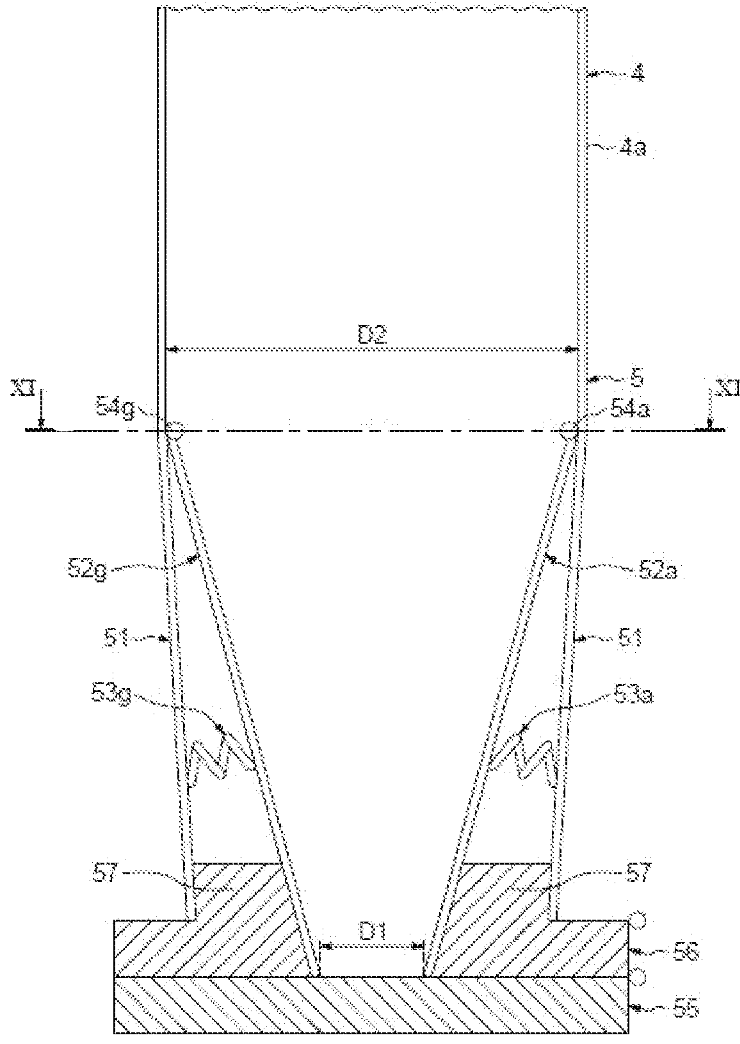
FIG. 9 is a sectional view along a vertical plane of a particular embodiment of the dropping hatch in the closed position.
Figure 10:
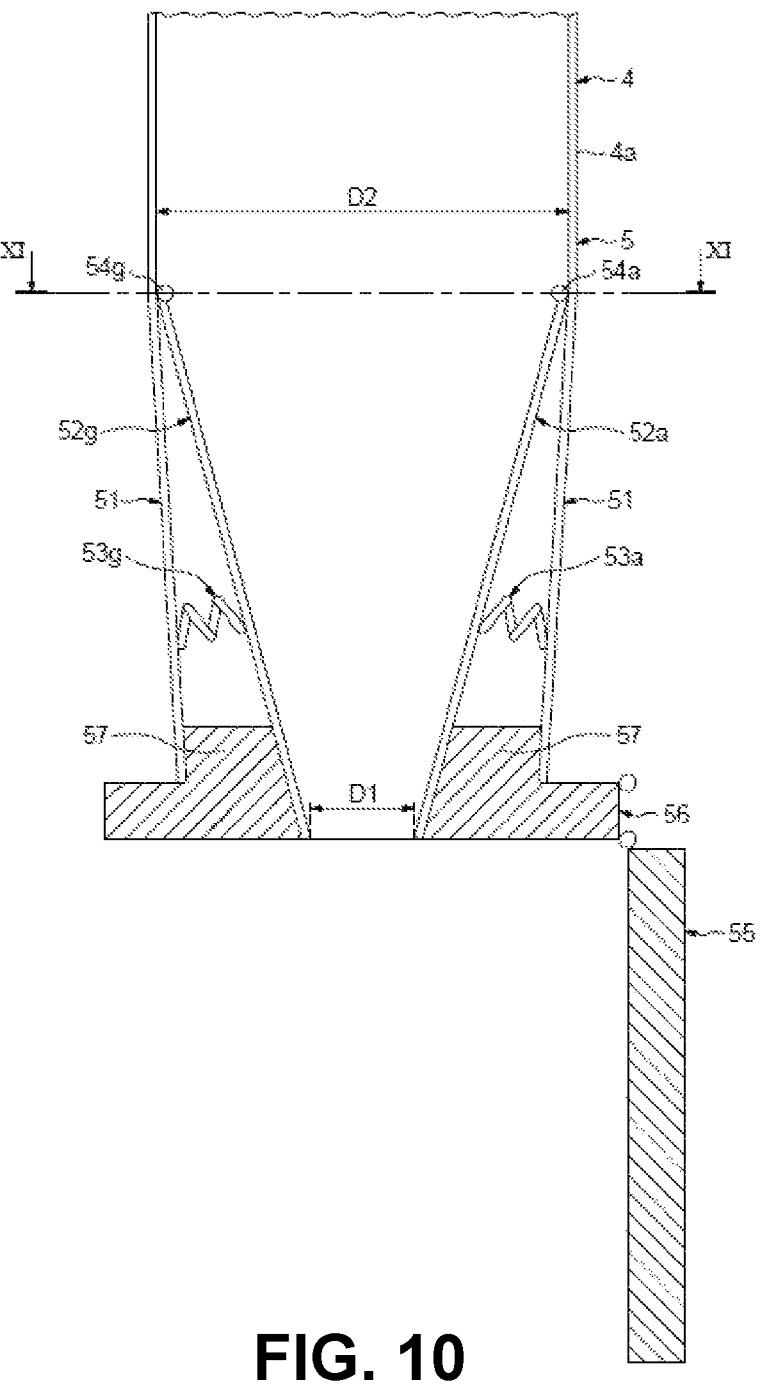
FIG. 10 shows the dropping hatch of FIG. 9, in the open position at the minimum diameter D2.

FIG. 8 represents a pressurised air diffuser comprising a tube 17 disposed perpendicular to the air inlet 7 as illustrated in FIG. 5. Alternatively, the tube 17 includes a plurality of holes, the size of which increases gradually with the increasing distance from the centre of the tube and the decreasing distance from the ends, so as to further disturb the surface of the liquid. The example is illustrated on a diffuser including a tube. Of course, this configuration can be applied to any type of shape of the air diffuser.

In a particular embodiment, it is possible to reduce the pressurisation requirements between the liquid outlet area 3 and the dropping hatch 5 by increasing the difference in altitude between the liquid outlet area 3 and the dropping hatch 5.

More specifically, the difference in altitude between the lower end of the liquid outlet area 3 and the level of the dropping hatch 5 will be denoted H0. The greater H0, the less pressurisation requirements, provided in particular by a pressurised air diffuser, will be necessary. This specific structure allows to avoid a heavy structure that the pressurisation means can constitute.

As shown in FIGS. 1 to 3, the dropping system 1 comprises a control module 18 integrating the pressure regulator 10 and acting on the dropping hatch 5.

For example, the regulator 10 is a proportional-integral-derivative (PID) type regulator capable of regulating the pressure prevailing in the reservoir 2 around a set value, from a measured pressure value, by acting on the solenoid valve 9.

In the example illustrated, the control module 18 is connected to the pressure sensors.

The pressure is measured at the converging portion of the liquid outlet area 3 or at the horizontal portion of the outlet nozzle 4 before the last bend, if a bend is present, or at the terminal portion 4*a* of the outlet nozzle, if no bend is present. When the measured pressure deviates from the set value, the control module 18 will be able to adjust the flow of air entering the storage reservoir 2 via the pressure regulator 10 that it controls. The pressure regulator 10 will consequently control the opening of the solenoid valve 9.

The liquid outlet flowrate is directly proportional to the liquid pressure at the outlet of the reservoir 2. By maintaining the pressure of the liquid at the outlet of the reservoir 2, either at the converging portion of the liquid outlet area, or at the horizontal portion of the outlet nozzle 4 before the last bend, if a bend is present, either at the terminal portion 4*a* of the outlet nozzle, if no bend is present, around a set value it is possible to keep the liquid outlet flowrate constant.

Thus, the air pressure in the storage reservoir 2 is adjusted, in the example illustrated by the control module 18, so as to compensate for the decrease in the pressure at the bottom of the reservoir 2 caused by the decrease in the level of liquid when dropping. This regulation allows to maintain a constant pressure at the outlet of the reservoir 2 and, consequently, to maintain a constant outlet flowrate and outlet speed of liquid. By ensuring a constant dropping speed and flowrate, a constant dropping width and therefore dropping footprint are ensured.

The resulting footprint made by the liquid on the area to be covered by the liquid will therefore be homogeneous and regular.

Such a dropping system 1 also allows to compensate for the variations in load factor undergone by a moving aircraft in the case where the liquid dropping system 1 is installed on an aircraft.

When the pressure at the outlet of the reservoir 2 deviates significantly from the set value, the control module 18 can be configured to close the dropping hatch 5. This avoids the unnecessary dropping of the retardant, the cost of which is relatively high.

As recalled above, in an alternative embodiment, the set value is given by the pressure P0.

In a particular embodiment, the dropping hatch 5 comprises a converging nozzle and/or a honeycomb structure through which the liquid can pass.

In a particular embodiment illustrated in FIGS. 9 to 14, the dropping hatch comprises a converging nozzle the liquid outlet section of which is variable.

The liquid outlet section can have two diameters: a minimum outlet diameter D1 and a maximum outlet diameter D3.

Referring to FIGS. 9 to 14, the dropping hatch here comprises a structure in the shape of a cone truncated at the top formed by a fixed wall 51. More specifically, the internal surface of this cone truncated at the top comprises several movable walls also called flaps 52*a*, 52*b*, 52*c*, 52*d*, 52*e*, 52*f*, 52*g*, 52*h*, 52*i*, 52*j*, 52*k* and 52*l*, twelve movable walls in the example illustrated, rotatably mounted on the internal surface by their upper end. Only two opposite movable walls 52*a*, 52*g* are shown as this is a sectional representation.

The movable walls 52*a* to 52*l* of this cone truncated at the top are kept at a distance from the internal surface of the wall 51 by means of springs for holding in position 53*a* to 53*l* and thus define a minimum outlet diameter D1, the free end of the movable walls 52*a* to 52*l* forming a liquid outlet section of variable diameter.

The movable walls 52*a*, 52*b* are rotatably mounted by means of pivoting devices, here hinges 54*a* to 54*l*.

Preferably, the movable walls 52*a* to 52*g* or flaps are isosceles trapezoids, the wider side of the two opposite parallel sides of the trapezoid corresponding to the end rotatably mounted on the fixed wall 51. The outlet of the dropping hatch 5 includes two locking plates. A first locking plate 55 closes the opening formed by the free end of the fixed side walls 51*a*, 51*b* and allows to prevent any outflow of liquid, when it is in the closed position.

A second locking plate 56 is mounted upstream of the first locking plate 55, relative to the direction of outlet of the liquid. The second locking plate 56 corresponds to a wall open at its centre, the opening being of diameter D1.

Here, the periphery of the opening of the second locking plate 56 forms a stop 57 for the flaps 52*a* to 52*l* which, when the second locking plate 56 is in the closed position, prevent the flaps from forming a drop section greater than the diameter D1.

The first and second locking plates 55 and 56 are each locked in the closed position by a latch 8 as described above and not shown in FIG. 9 but shown in FIGS. 1 to 3.

Figure 11:
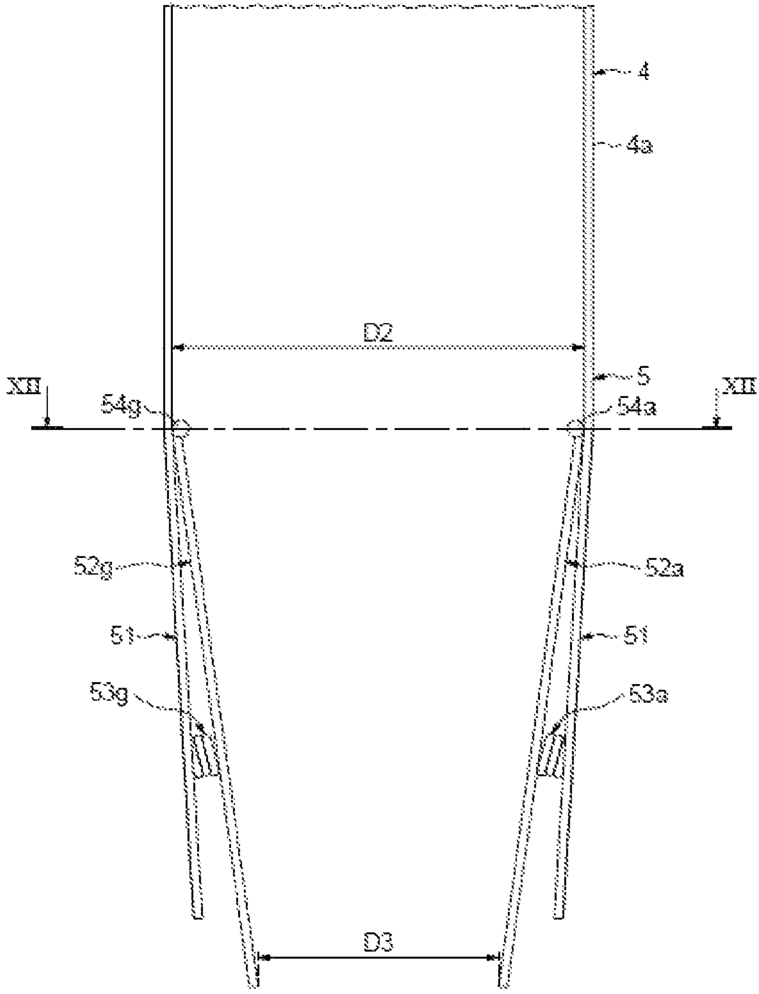
FIG. 11 shows the dropping hatch of FIG. 9, in the open position at the maximum diameter D3.
Figure 12:
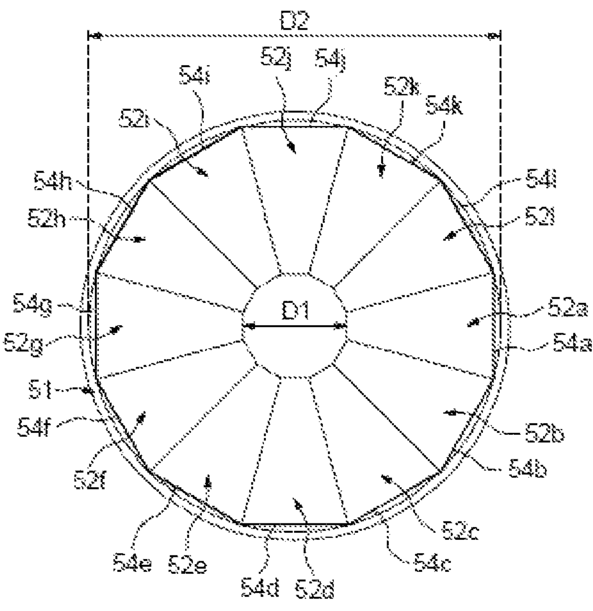
FIG. 12 is a sectional view along a horizontal plane of the dropping hatch of the embodiment illustrated in FIG. 9, in the closed position with opening to the minimum diameter D2.
Figure 13:
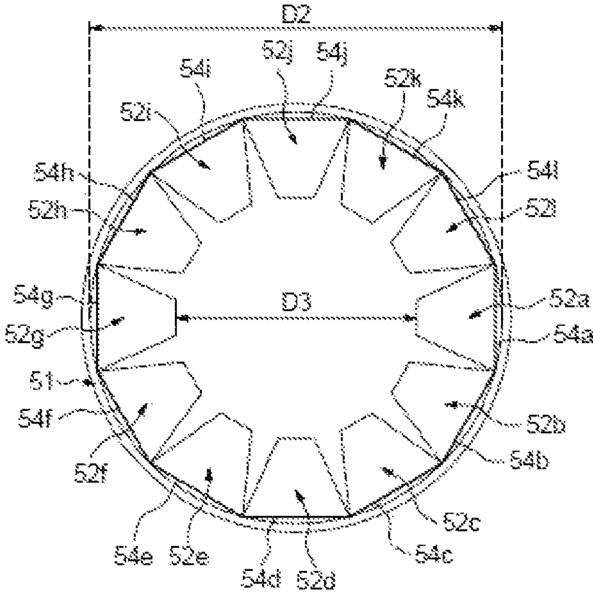
FIG. 13 shows the dropping hatch illustrated in FIG. 11, in the open position at the maximum diameter D3.

When the latch 8 associated with the first locking plate 55 and the latch 8 associated with the second locking plate 56 are actuated, the first and second locking plates 55 and 56 each pivot around a hinge and the liquid flows according to a dropping diameter section able to reach diameter D3, smaller than the diameter D2 of the outlet nozzle 4. FIG. 11 illustrates the dropping hatch 5 in the open position, when the two locking plates 55 and 56 are open. When the locking plates 55 and 56 are open, the springs 53*a* to 53*l* are calibrated so as not to oppose resistance to the opening of the plates 52*a* to 52*l* when a liquid flow exists, thus allowing to form a diameter drop section D3.

The springs are calibrated to push the plates 52*a* to 52*l* back into the rest position when the outlet nozzle 4 is empty, forming an opening of section D1 which will allow the locking plate 56 to be repositioned in the closed position.

The greater the force exerted on the movable walls 52*a* to 52*l*, and therefore on the spring, the greater the liquid outlet section. The less significant the force exerted on the moving walls, the smaller the liquid outlet section.

When the second locking plate 56 is in the closed position and the first locking plate 55 is in the open position, the liquid flows through the opening of the second locking plate 56. Taking into account the retaining stop 57, the diameter of the liquid outlet section does not exceed the diameter D1.

A gas detector 19 can be provided at the outlet of the storage reservoir 2 in order to detect a two-phase flow of the liquid resulting from the mixing of the air with the liquid.

Moreover, the storage reservoir can comprise a pressure relief valve.

As indicated above, provision can be made for the liquid dropping system 1 to be installed on a firefighting aircraft, wherein the liquid will be a retardant.

Provision can also be made for the liquid dropping system 1 to be used for an application other than fire fighting.

The dropping system 1 could for example be used in industry, or in the dropping, by air or not, of agricultural, meteorological or else environmental products.

The liquid to be dropped can then be, for example, a pesticide, a solvent or else a liquid for treating oil slicks.

In the system for dropping a liquid 1, the primary source for the dropping is gravity. The dropping system thus based on simple means, also provides the possibility of maintaining a constant flowrate and flow speed of the liquid. The appearance of disturbances in the flow of the liquid is ruled out and the end of the dropping is carried out without loss of efficiency, leading to an improved rate of covering by the liquid on the area to be covered.

The invention claimed is:

1. A liquid dropping system, comprising a liquid storage reservoir comprising a cylindrical storage area with a round base and a conical liquid outlet area, the conical liquid outlet area being provided with an outlet nozzle and a dropping hatch, characterised in that the liquid dropping system comprises means for varying an air pressure in the liquid storage reservoir depending on a level of a liquid in the liquid storage reservoir, the means for varying the air pressure in the reservoir comprising a pressurised air diffuser capable of distributing an air supply over a surface of the liquid and a pressure regulator acting on the air pressure in the reservoir, wherein said pressure regulator is also able to regulate a pressure of a liquid leaving the reservoir to be around a set value, and wherein the liquid dropping system comprises a control module acting on the pressure regulator and on the dropping hatch.

2. The dropping system according to claim 1, wherein the pressurised air diffuser has a spiral shape.

3. The dropping system according to claim 1, wherein the air diffuser comprises at least one tube disposed perpendicular to an air intake supplying the diffuser with air.

4. The dropping system according to claim 1, wherein the air diffuser comprises at least two tubes disposed perpendicular to an air intake supplying the diffuser with air, the tubes being disposed so that the longitudinal axes of the tubes form therebetween a non-zero angle.

5. The dropping system according to claim 1, wherein the air diffuser comprises a disc disposed in the liquid storage reservoir downstream and at a distance from an air intake in fluid communication with the liquid storage reservoir and perpendicular to said air intake.

6. The dropping system according to claim 1, wherein the outlet nozzle is bent.

7. The dropping system according to claim 1, wherein the conical liquid outlet area forms an angle with a general axis of the liquid storage reservoir comprised between 30° and 50°.

8. The dropping system according to claim 1, comprising a gas detector at the outlet of the liquid storage reservoir.

9. The dropping system according to claim 1, characterised in that the dropping hatch comprises a converging nozzle the liquid outlet section of which is variable.

10. A firefighting aircraft, comprising a dropping system according to claim 1, and wherein the liquid is a retardant.

* * * * *